United States Patent [19]

Lindstrom et al.

[11] Patent Number: 4,670,163
[45] Date of Patent: Jun. 2, 1987

[54] INHIBITING CORROSION

[75] Inventors: Merlin R. Lindstrom; Rector P. Louthan, both of Bartlesville, Okla.

[73] Assignee: Phillips Petroleum Company, Bartlesville, Okla.

[21] Appl. No.: 738,729

[22] Filed: May 29, 1985

[51] Int. Cl.$^4$ ............................................... C23F 11/04
[52] U.S. Cl. .................................. 252/8.555; 166/902; 252/151; 252/395; 422/12
[58] Field of Search ...................... 252/8.55 E, 8.55 C, 252/151, 395; 166/902; 422/12

[56] References Cited

U.S. PATENT DOCUMENTS

| | | | |
|---|---|---|---|
| 2,371,142 | 3/1945 | Barnum et al. | 252/395 X |
| 2,581,514 | 1/1952 | Chileote | 260/537 |
| 3,755,176 | 8/1973 | Kinney et al. | 252/48.6 |
| 4,222,853 | 9/1980 | Scherrer et al. | 208/48 AA |
| 4,253,876 | 3/1981 | Godar et al. | 106/14.42 |
| 4,411,808 | 10/1983 | Gutierrez et al. | 252/78.1 |
| 4,422,953 | 12/1983 | Grace et al. | 252/392 |
| 4,495,336 | 1/1985 | Haulser et al. | 252/8.55 |

Primary Examiner—Herbert B. Guynn

[57] ABSTRACT

Halohydroxyalkylthio-substituted an dihydroxyalkylthio-substituted polycarboxylic acids and alkali metal salts thereof are effective corrosion inhibitors for various metal surfaces. In one embodiment, mineral acid compositions such as aqueous hydrochloric acid metal cleaning solutions exhibit diminished corrosiveness when corrosion inhibiting additives of the invention are present in the compositions.

15 Claims, No Drawings

INHIBITING CORROSION

BACKGROUND OF THE INVENTION

This invention relates to the treatment of metal surfaces to increase resistance to corrosion. In another aspect this invention relates to compositions which form a corrosion resistant film on metal surfaces to which the compositions are applied. This invention further relates to the inhibition of corrosion caused by compositions comprising acidic liquids in contact with metal during acidic processing, e.g. pickling. More particularly, the invention relates to inhibiting such corrosion by adding to the composition an additive which will impart the desired properties thereto.

The problem of corrosion of metal surfaces in contact with various corrosive materials is well known. Most acidic liquids or compositions comprising same will cause corrosion when in contact with metals. The extent of such corrosion will, of course, depend to a large extent on the system on or in which the acidic material is to be used or upon the environmental conditions of such use. For example, corrosion of metal pipes, pumps and other equipment is a serious problem requiring monitoring of metal surfaces in drilling equipment used in oil well recovery operations. The down well metal surfaces are in contact with large quantities of corrosive materials and extreme conditions of temperature and pressure act to accelerate corrosion and intensify the problems of maintaining chemical protection for the equipment.

Conventional corrosion inhibiting agents are often not effective at all under extreme conditions or reduce corrosion for only a short period of time and then must be reapplied often at great expense and inconvenience if the well site is not easily accessible or poses difficulties of transporting and applying large volumes of chemicals.

In the area of coating of metals, a clean surface is a prerequisite to a quality coating. Grease, metal oxides, including scale, shop dirt, will adversely affect the adhesion, continuity and permanence of the coating by acting as a physical barrier which prevents proper bonding of the coating to the metal.

Metal surfaces can be cleaned by solvent, solvent emulsion, alkaline cleaners, solvent vapor degreasing, or abrasive blasting. Conventional cleaners will not remove scale and oxides from metals. Thus, it is necessary sometimes to use an acid treatment (pickling) to remove rust and other corrosion products. However, acids generally used are corrosive and, therefore, there is a need to inhibit such corrosion.

The invention relates to methods and materials suitable for inhibiting corrosion of a material subject thereto and particularly concerning the inhibition of corrosion of metals such as porous metal, aluminum, copper, brass, solder, and the like.

Accordingly, an object of this invention is to provide compositions which can be applied to metal surfaces to inhibit corrosion and pitting of the metal.

Another object of the invention is to provide a method of treating metal surfaces so as to form a film which inhibits corrosion on the metal even under extreme conditions of temperature and pressure and in highly corrosive environments.

Onother object of this invention is to provide inhibitors effective for decreasing corrosion due to acidic materials.

Other objects, aspects, as well as the several advantages of the invention will be apparent to those skilled in the art upon reading the specification and the appended claims.

SUMMARY OF THE INVENTION

According to the invention, it has been discovered that halohydroxyalkylthio-substituted and dihydroxyalkylthio-substituted polycarboxylic acids and corresponding alkali metal salts thereof exhibit good corrosion inhibition.

In accordance with one embodiment of the invention there are provided compositions comprising aqueous acidic fluids and a corrosion inhibiting amount of at least one halohydroxyalkylthio-substituted and dihydroxyalkylthio-substituted polycarboxylic acid and corresponding alkali metal salts thereof.

Therefore, in one embodiment of the present invention there are provided novel corrosion inhibiting compositions useful for treating metal surfaces. In another embodiment of this invention there is further provided methods of treating metal surfaces with compositions that will inhibit corrosion or provide a corrosion inhibiting film on metal surfaces.

The compositions of the invention can be applied by contacting a metal surface with the compositions so that a film is formed thereon. The compositions can be applied as a solution of one corrosion inhibitor or by contacting the metal with a solution containing one or more of the corrosion inhibitors of the invention.

DESCRIPTION OF THE INVENTION

The invention corrosion inhibiting compositions comprise at least one halohydroxyalkylthio-substituted and dihydroxyalkylthio-substituted polycarboxylic acid and corresponding alkali metal salts thereof. In one embodiment of the invention the corrosion inhibiting additive is part of a composition comprising an aqueous acidic composition containing a mineral acid, for example, HCl, or a phosphoric acid or other pickling acid.

In one specific embodiment of the invention, dihydroxyalkylthio-substituted polycarboxylates such as the composition resulting from the reaction of thioglycerin (2,3-dihydroxy-1-propanethiol) with maleic anhydride followed by alkaline aqueous hydrolysis to provide disodium 2-(2',3'-dihydroxy-1'-propylthio)succinate are effective corrosion inhibitors in HCl-based cleaning solutions.

In another specific embodiment of the invention, halohydroxyalkylthio-substituted polycarboxylates such as the composition resulting from the reaction of 3-chloro-2-hydroxy-1-propanethiol with maleic anhydride followed by alkaline aqueous hydrolysis to provide disodium 2-(3'-chloro-2'-hydroxy-1'-propylthio)-succinate are effective corrosion inhibitors in HCl-based cleaning solutions.

The dihydroxyalkylthioether and halogenated hydroxyalkylthioether substituents of the acids and salts thereof of the invention will contain from 3 to 5 carbon atoms and the halogen can be any of the halogens, preferably chlorine.

The corrosion inhibiting compositions of the instant invention are prepared by reacting unsaturated polycarboxylic acids or their water soluble alkali metal salts or the corresponding anhydrides or esters with appropriately substituted alkanethiols in accordance with procedures known in the art. The ester adducts with said thiols are not corrosion inhibitors per se and hence must be hydrolyzed, e.g., with aqueous sodium hydroxide which provides the corresponding corrosion inhibiting sodium salts.

Suitable unsaturated polycarboxylic acids, salts and esters are described by formula (A)

$$Q(COOM)_n \qquad (A)$$

wherein M represents hydrogen, alkali metal cation, methyl and ethyl and Q is a divalent or trivalent linear or branched olefinically unsaturated radical containing two to four carbon atoms and n is 2 or 3. Various anhydrides of the above unsaturated polycarboxylic acids can also be reacted with appropriately substituted alkanethiols to give adducts which, e.g., can be hydrolyzed with aqueous sodium hydroxide to yield the corresponding corrosion inhibiting sodium salts. Examples of suitable unsaturated polycarboxylic acids, salts, anhydrides and esters are the following: maleic anhydride, disodium maleate, dimethyl maleate, diethyl itaconate, disodium alpha-methylene succinate, glutaconic acid, diethyl glutaconate, 2-methyl maleic anhydride, dimethyl 2-methyl maleate, aconitic acid, 3-methylene glutaric acid, dimethyl 3-methylene glutarate, disodium glutaconate and the like. The preferred corrosion inhibiting compositions of the instant invention, viz., disodium 2-(3'-chloro-2'-hydroxy-1'-propylthio)succinate and disodium 2-(2',3'-dihydroxy-1'-propylthio)succinate are prepared by the reaction of dimethyl maleate, respectively, with 3-chloro-2-hydroxy-1-propanethiol and 3-mercapto-1,2,-propanediol followed by the aqueous NaOH hydrolysis of the adducts to the desired disodium salts.

Suitable thiols are described by formula (B):

$$R_1SH \qquad (B)$$

wherein $R_1$ is a halohydroxyalkyl or dihydroxyalkyl containing 3 or 4 carbon atoms. Representative thiols include 3-chloro-2-hydroxy-1-propanethiol, 3-mercapto-1,2,-propanediol, 3-bromo-2-hydroxy-1-propanethiol, 3-mercapto-1,2,-butanediol, 4-chloro-3-mercapto-2-butanol, 2-hydroxy-2-methyl-3-bromo-1-propanethiol, 2-mercapto-1,3-butanediol, 2-hydroxy-3-chloro-1-butanethiol and the like and mixtures thereof. The presently preferred thiols are 3-chloro-2-hydroxy-1-propanethiol and 3-mercapto-1,2-propanediol.

Corrosion inhibiting compositions suitable for use in the present invention include the following polycarboxylic acid derivatives and mixtures thereof as well as the corresponding alkali metal salts: 2-(3'-chloro-2'-hydroxy-1'-propylthio)succinic acid; 2-(2',3'-dihydroxy-1'-propylthio)succinic acid; 2-(3'-bromo-2'-hydroxy-1'-propylthio)succinic acid; 2-(2'-hydroxy-1'-chloromethyl-1'-propylthio)succinic acid; 2-(3'-bromo-2'-hydroxy-2'-methyl-1'-propylthio)succinic acid; 2-(1'-methyl-2',3'-dihydroxy-1'-propylthio)succinic acid; 2-(1'-hydroxymethyl-2'-hydroxy-1'-propylthio)succinic acid; 3-(3'-bromo-2'-hydroxy-1'-propylthio)glutaric acid; 2-(3'-bromo-2'-hydroxy-1'-propylthio)glutaric acid; 1-(2',3'-dihydroxy-1'-propylthio)-1,2,3-propane tricarboxylic acid; 2-(2',3'-dihydroxy-1'-butylthio)succinic acid; 2-(3'-chloro-2'-hydroxy-1'-butylthio)succinic acid; 2-methyl-3-(1'-hydroxymethyl-2'-hydroxy-1'-propylthio)succinic acid; 2-methyl-3-(3'-chloro-2'-hydroxy-1'-propylthio)succinic acid; 2-(3'-chloro-2'-hydroxy-1'-propylthio)-1,2,3-propane tricarboxylic acid; 2-(3'-bromo-2'-hydroxy-1'-butylthio)-1,2,3-propane tricarboxylic acid; 3-(2',3'-dihydroxy-1'-propylthio)glutaric acid; 2-(2',3'-dihydroxy-1'-propylthio)glutaric acid; 2-methyl-3-(2',3'-dihydroxy-1'-propylthio)succinic acid; 2-methyl-3-(3'-bromo-2'-hydroxy-1'-propylthio)succinic acid; 1-(3'-chloro-2'-hydroxy-1'-propylthio)-1,2,3-propane tricarboxylic acid; 2-methyl-3-(2'-hydroxy-1'-chloromethyl-1'-propylthio)succinic acid; 3-(3'-chloro-2'-hydroxy-1'-propylthio)glutaric acid; 2-(3'-chloro-2'-hydroxy-1'-propylthio)glutaric acid; 2-(2',3'-dihydroxy-1'-propylthio)-1,2,3-propane tricarboxylic acid; 3-(2',3'-dihydroxy-1'-butylthio)glutaric acid; 2-(3'-chloro-2'-hydroxy-1'-butylthio)glutaric acid; 2-(2'-hydroxy-1'-bromomethyl-1'-propylthio)succinic acid; 2-methyl-2-(3'-chloro-2'-hydroxy-1'-propylthio)succinic acid; 2-methyl-2-(2',3'-dihydroxy-1'-propylthio)succinic acid; 3-methyl-3-(3'-chloro-2'-hydroxy-1'-propylthio)glutaric acid; 3-(3'-chloro-2'-hydroxy-1'-propylthiamethyl)glutaric acid; 3-methyl-3-(2',3'-dihydroxy-1'-propylthio)glutaric acid; and 3-(2',3'-dihydroxy-1'-propylthiamethyl)glutaric acid and the like and mixtures thereof.

The corrosion inhibiting additives of the invention are known compounds in the art and can be prepared by methods known in the art.

The corrosion inhibiting agents of the invention can be applied directly to metal surfaces to provide a corrosion inhibiting film thereon or can be applied to metal surfaces as part of an acidic or other composition. Typical acidic compositions include aqueous mineral acids such as HCl, $H_2SO_4$, phosphoric, etc. The concentration of acid present in the aqueous compositions can vary appreciably and ordinarily will range from ~0.5 weight percent to ~30 weight percent.

The amount of corrosion inhibiting agent present in an aqueous acidic composition, for example, will ordinarily range from 0.05 to 5 weight percent.

The invention compositions are useful for coating oxidizable metal surfaces, particularly surfaces of objects made from iron and steel. It is particularly useful for treating metal surfaces such as steel. It is particularly useful for treating metal surfaces such as metal pipes and casings in oil, gas and geothermal wells, which are subjected to high temperatures and pressure and corrosive chemical agents and for treating pipelines which carry fluids containing water.

In some treatment methods it is advantageous to employ a carrier liquid or drive fluid to force a slug of the corrosion-inhibiting composition down into the well being treated. Suitable diluents that can be used include hydrocarbons, such as isomeric xylenes, toluene, benzene, naphtha, fuel oil, diesel oil, heavy aromatic oils, Stoddard solvent, and crude oil. In view of practical and economic reasons, diesel oils, sea water or condensate from the well being treated are preferred carrier fluids. An inert gas, such as nitrogen, can be used as a drive fluid.

Down-hole treatments with the corrosion-inhibiting compositions can be effected by a variety of methods, depending upon the particular chemical and physical characteristics of the well being treated. The following down-hole treatment methods can be used to apply the composition to metal surfaces of equipment used to recover natural fluids from a subterranean reservior.

Batch Treatment. The invention composition and hydrocarbon diluent is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 1 hour.

Extended Batch Treatment. The invention composition is injected into the annular space of a cased wellbore, the well is closed off, and the composition is continuously circulated with well fluids down the annulus and up the tubing for an extended period of time which can vary widely but will usually be between 2 and 48 hours. At the end of the determined time period, the well is returned to production.

Squeeze Treatment. The invention composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluid, resulting in the application of a corrosion-resistant film on metal surfaces contacted by the treating agent as it flows to the surface. This method is particularly suitable in high-pressure gas or oil wells.

Spearhead Treatment. A highly concentrated slug of the invention composition is injected into the tubing of a cased borehole and pressured down the tube with nitrogen or a fluid column of a brine solution such as 2 weight percent aqueous potassium chloride. When the pressure is released, the aqueous brine column or nitrogen and the corrosion-inhibiting composition are produced up the tubing. The composition as a concentrated slug thus contacts the metal walls of the tubing and lays down a protective film as it flows in a downward and upward circuit.

Metal surfaces can also be protected by dipping or spraying the surfaces with the invention compositions and then allowing excess fluid to drain from the treated surfaces at ambient conditions. A protective film is thus formed on the metal surface without conventional heat-curing or extended air-drying treatment, although such drying treatments can be used if desired and if conditions permit it. The advantage in using an anti-corrosion system which does not require air- or heat-drying is that the system can be applied to metal surfaces which are hundreds or thousands of feet below ground level or in an environment which is always flooded with brine or other fluids.

When applying the composition to the metal tubing of, for example, a gas or oil well, it is not necessary to pre-coat the treated metal surfaces with oil or other substances prior to applying the invention composition, and the treated surfaces may or may not have an oil coating prior to the application. It is contemplated that the invention composition will provide effective corrosion inhibition in wells producing as much as 95 percent brine and 5 percent oil.

The following examples illustrate the present invention.

EXAMPLE I

A series of runs was carried out in which mild steel coupons were immersed in 10 weight percent HCl. In the control runs the HCl did not contain a corrosion inhibitor of the invention, and in the invention runs the HCl contained a corrosion inhibitor of the invention.

The results of these tests are set forth in the following Table:

TABLE I

Disodium 2-(2',3'-Dihydroxy-1'-propylthio)succinate (DDS) As A Corrosion Inhibitor in 10 weight Percent Aqueous HCl (200F)

| Steel Coupon No. | Run No. | Additive | Coupon Weight Loss g/3 Hr. | Corrosion Rate (lb/ft²/day) | Ave. % Inhibition |
|---|---|---|---|---|---|
| 87 | 1 | None | 5.6832 | 8.38 | None (Control) |
| 88 | 2 | None | 5.6211 | 8.32 | None (Control) |
| 91 | 3 | DDS$^a$ | 0.3179 | 0.47 | ca 94.5 |
| 92 | 4 | DDS$^a$ | 0.2981 | 0.44 | ca 94.5 |
| 40 | 5 | DTSA$^b$ | 6.6194 | 8.60 | 34* (Control) |
| 41 | 6 | DTSA$^b$ | 5.7739 | 7.50 | |
| 11 | 7 | DTSA$^b$ | 4.5606 | 5.90 | 59** (Control) |
| 12 | 8 | DTSA$^b$ | 3.3292 | 4.31 | 59 |

$^a$See title composition.
$^b$DTSA represents n-dodecylthiosuccinic acid
*Blank showed average corrosion rate of 12.2
**Blank showed average corrosion rate of 12.5

Referring to the results in Table I, it is evident that the disodium 2-(2',3'-dihydroxy-1'-propylthio)succinate inhibited the corrosion of mild steel coupons in 10 weight percent aqueous hydrochloride acid at 200 F. for a period of 3 hours. The results with n-dodecylthiosuccinic acid (runs 5–8) demonstrate that the alkylthiosuccinic acid is significantly less effective as a corrosion inhibitor than the instant 2-(2',3'-dihydroxy-1'-propylthio)succinate (runs 3 and 4).

EXAMPLE II

A series of runs was carried out in which mild steel coupons were immersed in 10 weight percent HCl. In the control runs the HCl did not contain a corrosion inhibitor, and in the invention runs the HCl contained a corrosion inhibitor of the invention.

The results of these tests are set forth in the following Table:

TABLE II 2-(3'-Chloro-2'-hydroxy-1'-propylthio)succinic Acid (CHSA) As A Corrosion Inhibitor in 10 Weight Percent Aqueous HCl 200F

| Steel Coupon No. | Run No. | Additive | Coupon Weight Loss (g/3 Hr.) | Corrosion Rate (lb/ft²/day) | Ave. % Inhibition |
|---|---|---|---|---|---|
| 63 | 9 | None | 5.5619 | 8.21 | None (Control) |
| 64 | 10 | None | 5.7426 | 8.47 | None (Control) |
| 65 | 11 | DMCS$^a$ | 5.2465 | 7.71 | 9.71% (Control) |
| 66 | 12 | DMCS$^a$ | 5.0012 | 7.35 | |
| 73 | 13 | CHSA$^b$ | 0.2384 | 0.35 | 94.54 (Invention) |
| 74 | 14 | CHSA$^b$ | 0.3783 | 0.56 | |
| 40 | 15 | DTSA$^c$ | 6.6194 | 8.60 | 34* (Control) |
| 41 | 16 | DTSA$^c$ | 5.7739 | 7.50 | |
| 11 | 17 | DTSA$^c$ | 4.5606 | 5.90 | 59** (Control) |

TABLE II-continued 2-(3'-Chloro-2'-hydroxy-1'-propylthio)succinic Acid (CHSA) As A Corrosion Inhibitor in 10 Weight Percent Aqueous HCl 200F

| Steel Coupon No. | Run No. | Additive | Coupon Weight Loss (g/3 Hr.) | Corrosion Rate (lb/ft²/day) | Ave. % Inhibition |
|---|---|---|---|---|---|
| 12 | 18 | DTSA[c] | 3.3292 | 4.31 | |

[a]DMCS represents dimethyl-2-(3'-chloro-2'-hydroxy-1'-propylthio)succinate
[b]See title composition.
[c]DTSA represents n-dodecylthiosuccinic acid
*Blank showed average corrosion rate of 12.2
**Blank showed average corrosion rate of 12.5

Referring to the results in Table II, it is evident that the 2-(3'-chloro-2'-hydroxy-1'-propylthio)succinic acid inhibited the corrosion of mild steel coupons in 10 weight percent aqueous hydrochloric acid at 200 F. for a period of 3 hours. It is noteworthy that the 2-(3'-chloro-2'-hydroxy-1'-propylthio)succinic acid (runs 13, 14) was significantly more effective in the system studied than was the corresponding dimethyl ester (runs 11 and 12).

The results with n-dodecylthiosuccinic acid (runs 15–18) demonstrate that this alkylthiosuccinic acid is significantly less effective as a corrosion inhibitor than the instant 2-(3'-chloro-2'-hydroxy-1'-propylthio)succinic acid (runs 13 and 14).

EXAMPLE III (CONTROL RUN)

In this run a sample of disodium 2-(1'-propylthio)succinate was tested for inhibiting the corrosion of metal coupons in aqueous acid. The sample was prepared by reacting maleic anhydride with 1-propanethiol followed by hydrolysis of the adduct in aqueous NaOH to provide the disodium salt.

Carbon steel coupons of known surface area were vapor degreased with 1,1,1-trichloroethane, scrubbed with a commerically available cleaner before rising with distilled water followed by reagent grade acetone. The coupons were dried overnight in a vacuum desiccator and weighed.

A 0.6 sample of disodium 2-(1'-propylthio)succinic was added to a solution of 200 mL of 10 weight percent aqueous hydrochloric acid contained in a glass test bottle. The test bottle containing the solution was immersed for 30 minutes in a constant temperature bath at 200 F. The cleaned dried carbon steel coupons were then suspended in the test solution for 3 hours. At the end of 3 hours, the metal coupons were removed from the bath and sequentially rinsed with water, scrubbed with a commercial cleaner, rinsed with distilled water and rinsed with reagent grade acetone before drying overnight in a vaccum desiccator and reweighing to determine weight loss. Corrosion rates in lb/ft²/day were calculated from the results. A summary of the results is given in Table III.

TABLE III

Disodium 2-(1'-Propylthio)succinate (DPTS) As A Corrosion Inhibitor in 10 Weight Percent Aqueous HCl (200F)

| Steel Coupon No. | Run No. | Additive | Coupon Weight Loss (g/3 Hr.) | Corrosion Rate (lb/ft²/day) | Average % Inhibition |
|---|---|---|---|---|---|
| 195 | 25 | DPTS[c] | 3.9728 | 5.09 | 8.0 |
| 196 | 26 | DPTS[c] | 3.7585 | 4.88 | |

[c]DPTS represents disodium 2-(1'-propylthio)succinate.

Runs 25 and 26 in Table III demonstrate that the DPTS sample was ineffective as a corrosion inhibitor in 10 weight percent aqueous HCl at 200 F.

We claim:

1. A method of inhibiting the corrosiveness of acidic systems which comprises incorporating into the system a corrosion inhibiting amount of a composition of at least one compound from the group consisting of halohydroxyalkylthio-substituted polycarboxylic acid, dihydroxyalkylthio-substituted polycarboxylic acid, corresponding alkali metal salts of said acids and mixtures thereof, wherein said compound has up to 3 carboxy groups and has a halohydroxyalkylthioether or dihydroxyalkylthioether substituent containing of 3 to 5 carbon atoms, said compound having been prepared by reacting a halohydroxy or dihydroxy substituted alkanethiol with an unsaturated polycarboxylic acid, salt or ester of the formula:

$$Q(COOM)_n$$

wherein M represents hydrogen, alkali metal cation, methyl or ethyl and Q is a divalent or trivalent linear or branched olefinically unsaturated radical containing two to four carbon atoms and n is 2 or 3 or an anhydride of said acid 2. A method according to claim 1 wherein the acid system contains a mineral acid.

3. A method according to claim 1 wherein the acid system contains HCl.

4. A method according to claim 3 wherein the corrosion inhibiting composition is chosen from among disodium 2-(2',3'-dihydroxy-1'-propylthio)succinate, disodium 2-(3'-chloro-2'-hydroxy-1'-propylthio)succinate, 2-(3'-chloro-2'-hydroxy-1'-propylthio)succinate acid and 2-(2',3'-dihydroxy-1'-propylthio)succinate acid.

5. A method according to claim 1 wherein the corrosion inhibiting additive is present in the system in an amount ranging from about 0.05 to about 5 weight percent of the total acidic system.

6. A method for treating metal surfaces to inhibit corrosion thereof comprising contacting a metal surface with a composition comprising at least one compound from the group consisting of halohydroxyalkylthio-substituted polycarboxylic acid, dihydroxyalkylthio-substituted polycarboxylic acids, corresponding alkali metal salts of said acids and mixtures thereof, wherein said compounds has up to 3 carboxy groups and has a halohydroxyalkylthioether or dihydroxyalkylthioether substituent containing of 3 to 5 carbon atoms, said compound having been prepared by reacting a halohydroxy or dihydroxy substituted alkanethiol with an unsaturated polycarboxylic acid, salt or ester of the formula:

$$Q(COOM)_n$$

wherein M represents hydrogen, alkali metal cation, methyl or ethyl and Q is a divalent or trivalent linear or branched olefinically unsaturated radical containing two to four carbon atoms and n is 2 or 3 or an anhydride of said acid.

7. A method according to claim 6 wherein the corrosion inhibiting additive is an alkali metal salt.

8. A method according to claim 6 wherein said composition is chosen from among disodium 2-(2',3'-dihydroxy-1'-propylthio)succinate, disodium 2-(3'-chloro-2'-hydroxy-1'-propylthio)succinate, 2-(3'-chloro-2'- hydroxy-1'-propylthio)succinic acid and 2-(2',3'-dihydroxy-1'-propylthio)-succinic acid.

9. A method according to claim 6 in which the metal surface includes drilling equipment in a well for the recovery of natural fluids from subterranean formations.

10. A method according to claim 9 wherein the composition is forced down the well using a drive fluid.

11. A corrosion inhibiting aqeuous composition comprising
(a) mineral acid, and
(b) at least one compound from the group consisting of halohydroxyalkylthio-substituted polycarboxylic acid, dihydrxyalkylthio-substituted polycarboxylic acid, corresponding alkali metal salts of said acids and mixtures thereof, wherein said compound has up to 3 carboxy groups and has a halohydroxyalkylthioether or dihydroxyalkylthioether substituent containing of 3 to 5 atoms, said compound having been prepared by reacting a halohydroxy or dihydroxy substituted alkanethiol with an unsaturated polycarboxylic acid, salt or ester of the formula:

$$Q(COOM)_n$$

wherein M represents hydrogen, alkali metal cation, methyl or ethyl and Q is a divalent or trivalent linear or branched olefinically unsaturated radical containing two to four carbon atoms and n is 2 or 3 or an anhydride of said acid.

12. A composition according to claim 11 wherein (a) is HCl.

13. A composition according to claim 11 wherein (b) is an alkali metal salt of said polycarboxylic acid.

14. A composition according to claim 11 wherein (a) is HCl and (b) is chosen from among disodium 2-(2',3'-dihydroxy-1'-propylthio)succinate, disodium 2-(3'-chloro-2'-hydroxy-1'-propylthio)succinate, 2-(3'-chloro-2'-hydroxy-1'-propylthio)succinic acid and 2-(2',3'-dihydroxy-1'-propylthio)succinic acid.

15. A composition according to claim 11 wherein (b) is present in an amount ranging from about 0.05 to 5 weight percent.

* * * * *